June 2, 1953  A. J. HARRIS  2,640,206
MECHANICAL DEVICE FOR OPERATING BOAT DAVITS
Filed Oct. 11, 1949  5 Sheets-Sheet 2

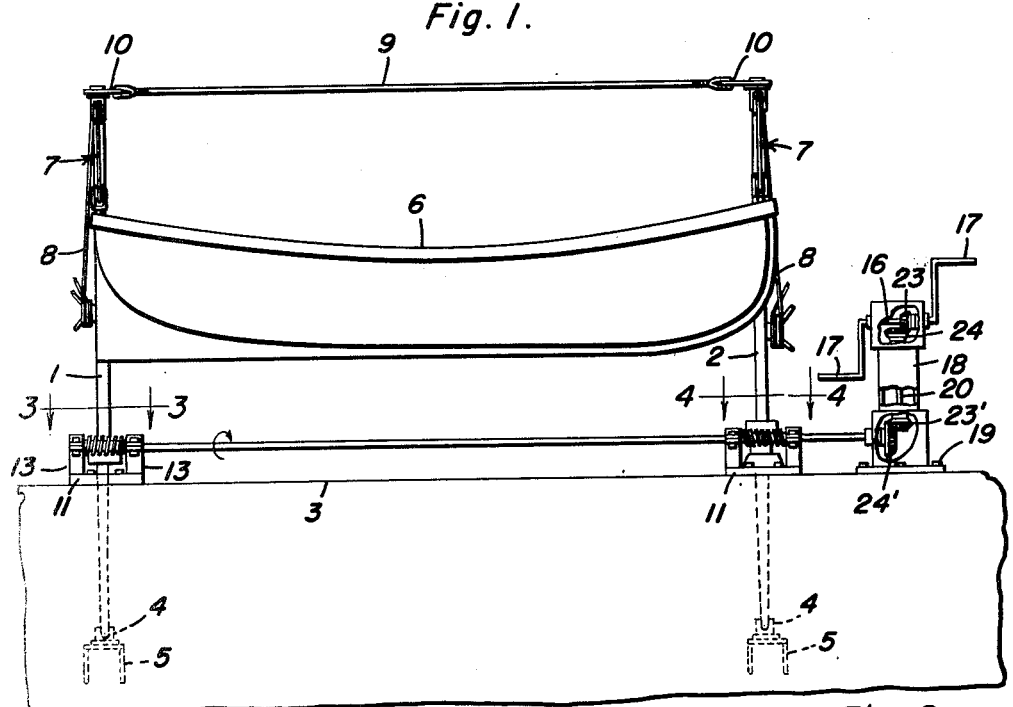
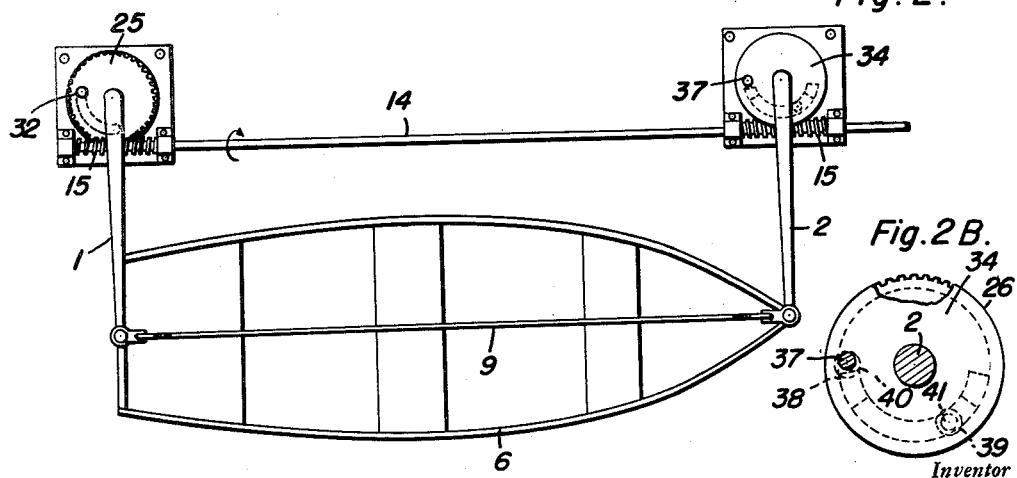
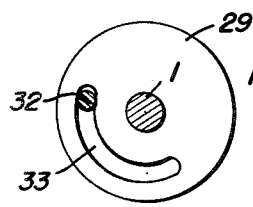

Inventor
Asa J. Harris
By Clarence A. O'Brien
and Harvey B. Jacobson
Attorneys

June 2, 1953  A. J. HARRIS  2,640,206
MECHANICAL DEVICE FOR OPERATING BOAT DAVITS
Filed Oct. 11, 1949  5 Sheets-Sheet 3
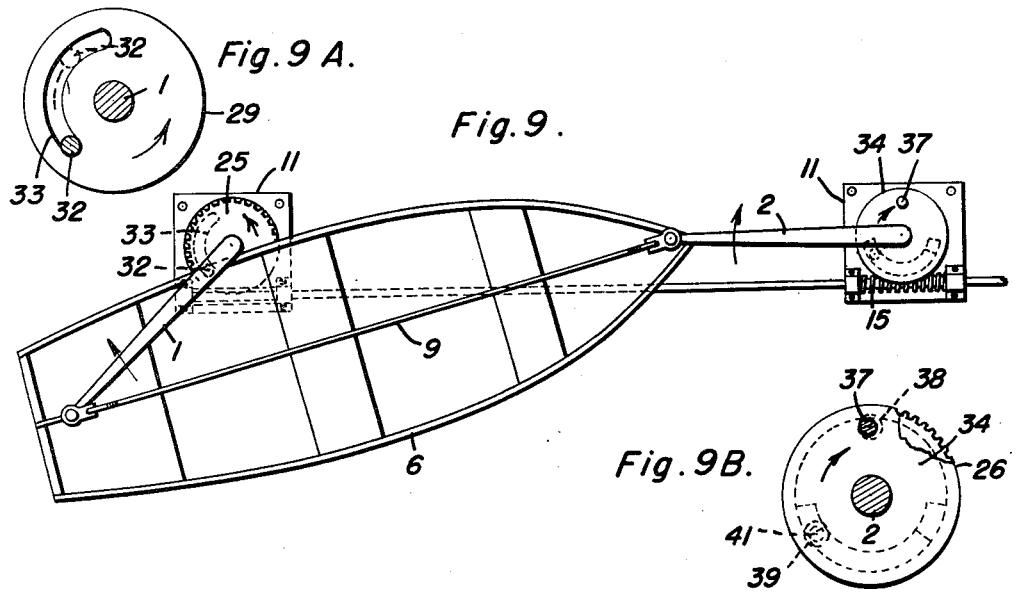
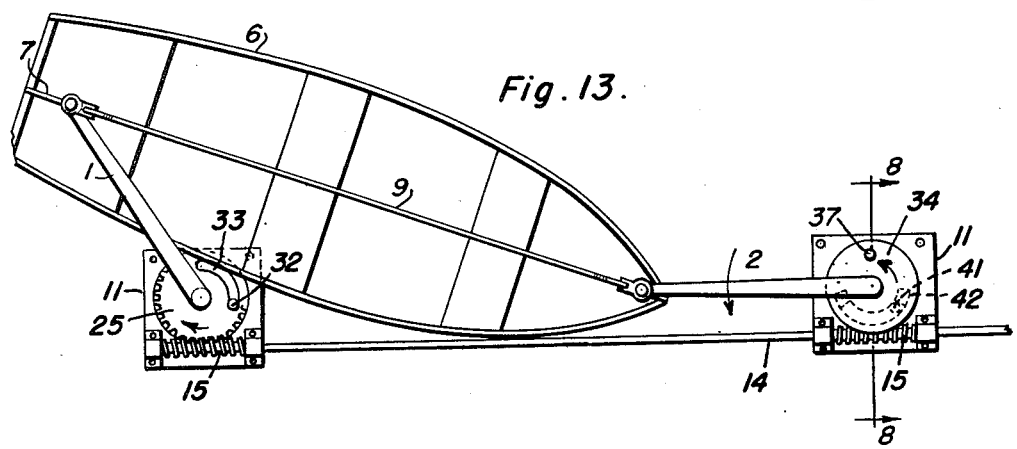
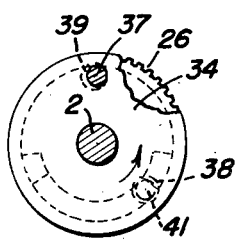
Inventor
Asa J. Harris

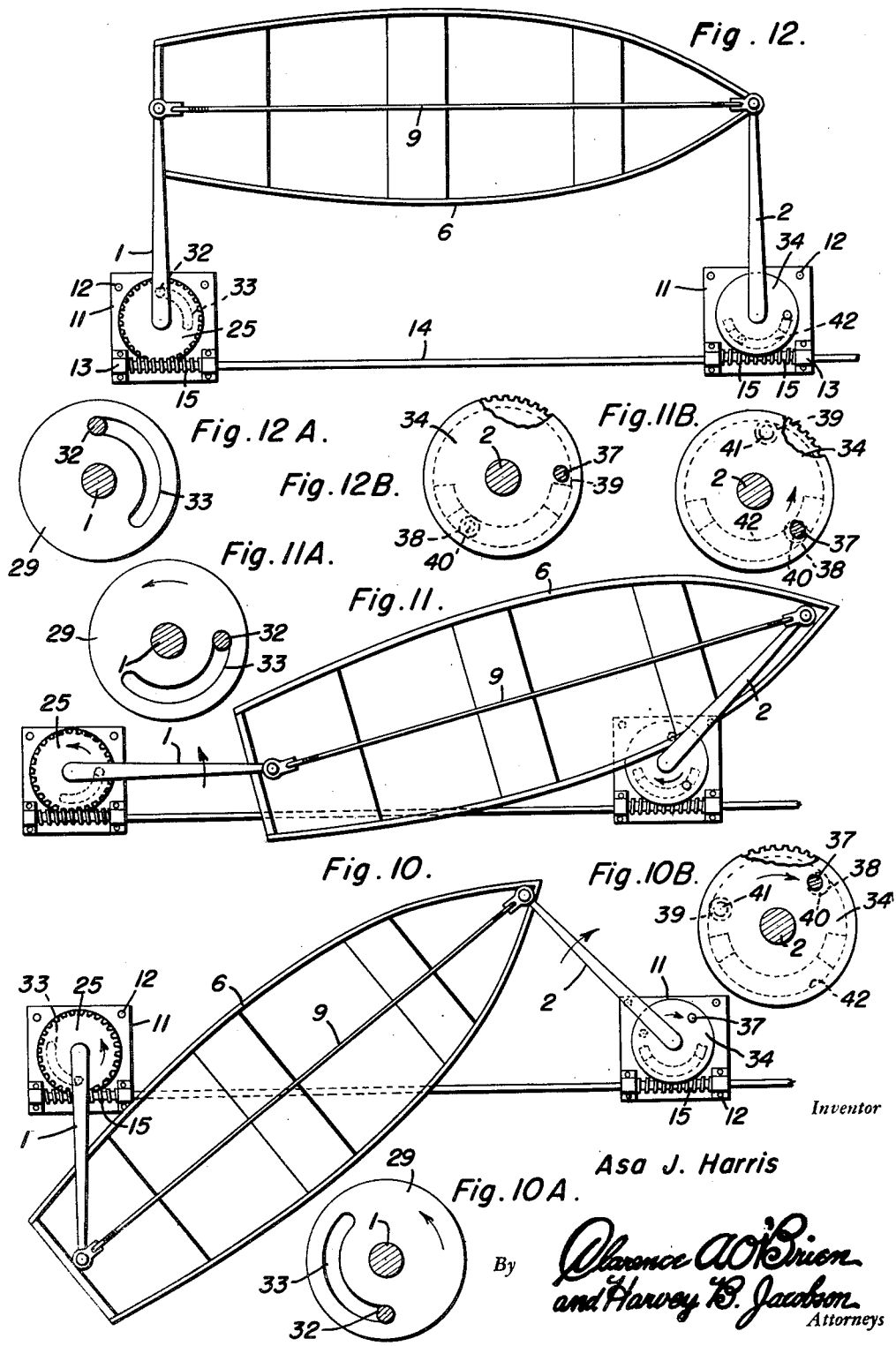

June 2, 1953  A. J. HARRIS  2,640,206
MECHANICAL DEVICE FOR OPERATING BOAT DAVITS
Filed Oct. 11, 1949  5 Sheets-Sheet 5
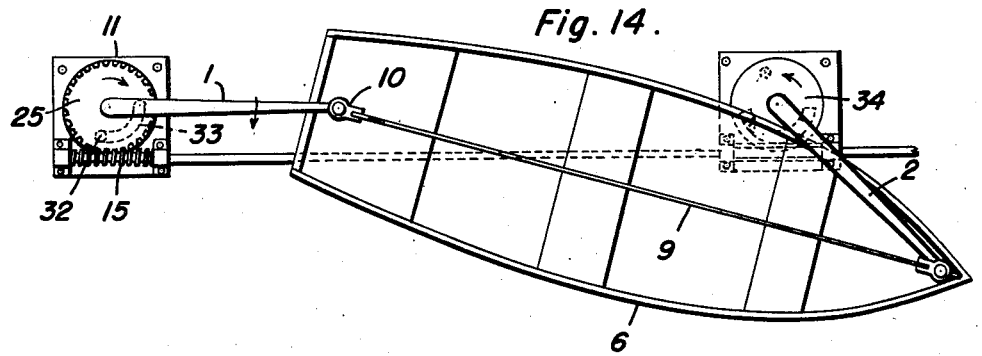
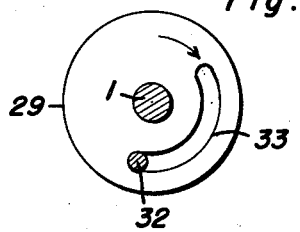
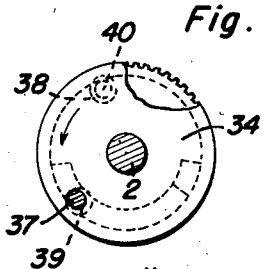
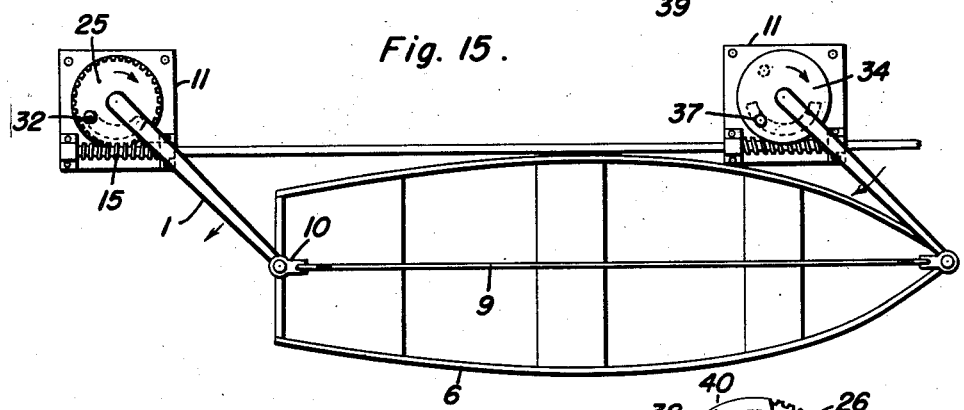
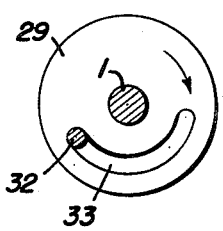
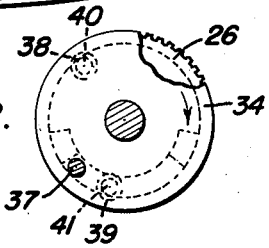
Inventor
Asa J. Harris
By *Clarence A. O'Brien and Harvey B. Jacobson*
Attorneys Patented June 2, 1953

2,640,206

UNITED STATES PATENT OFFICE 2,640,206

MECHANICAL DEVICE FOR OPERATING BOAT DAVITS

Asa J. Harris, Balboa, C. Z.

Application October 11, 1949, Serial No. 120,677

5 Claims. (Cl. 9—40)

My invention relates to improvements in mechanism for operating boat davits, the instant application for U. S. Letters Patent therefor being a continuation in part of my co-pending application Serial No. 771,885 filed September 3, 1947 and abandoned.

The primary object of my invention is to provide mechanical means of simple form and inexpensive construction for operating a pair of the usual crane type davits to swing a boat from inboard to outboard position, or vice versa, and lock the same in either position, all so as to save time and labor and expedite launching of life boats and the like.

Another object is to provide mechanism of the character and for the purpose above set forth which is safe, will not get out of order, requires a minimum of servicing, and is adapted for easy, quick installation on ships, wharves, or the like.

Other and subordinate objects, within the purview of my invention, together with the precise nature of my improvements will be readily understood when the succeeding description and claims are read with reference to the drawings accompanying and forming part of this specification.

In said drawings:

Figure 1 is a view in side elevation, partly broken away and shown in section, illustrating my improved mechanism and the preferred embodiment thereof, with the parts shown in the position assumed thereby when the boat is swung into final inboard position;

Figure 2 is a view in plan of the same;

Figures 2A and 2B are diagrammatic views showing the corresponding position of the driving disks and crank pins;

Figure 9 is a view in plan illustrating the first stage of operation of the mechanism in swinging the boat from inboard toward outboard position;

Figures 9E and 9B are enlarged diagrammatic views showing on a larger scale the corresponding positions of the driving disks and crank pins;

Figure 10 is a view in plan illustrating the second stage of operation of the mechanism in swinging the boat from inboard toward outboard position;

Figures 10A and 10B are diagrammatic views showing on a larger scale the corresponding position of the driving disks and crank pins;

Figure 11 is a view in plan illustrating the third stage of operation of the mechanism in swinging the boat from inboard toward outboard position;

Figures 11A and 11B are diagrammatic views showing on a larger scale the corresponding position of the driving disks and crank pins;

Figure 12 is a view in plan illustrating the manner in which the mechanism operates through the fourth stage of operation to swing the boat into final outboard position;

Figures 12A and 12B are diagrammatic views, illustrating on a larger scale the corresponding position of the driving disks and crank pins;

Figure 13 is a view in plan illustrating the first stage of operation of the mechanism in swinging the boat from outboard toward inboard position;

Figures 13A and 13B are diagrammatic views illustrating on a larger scale the corresponding positions of the driving disks and crank pins;

Figure 14 is a view in plan illustrating the second stage of operation of the mechanism in swinging the boat toward inboard position;

Figures 14A and 14B are diagrammatic views illustrating on a larger scale the corresponding position of the driving disks and crank pins;

Figure 15 is a view in plan illustrating the third stage of operation of the mechanism in swinging the boat toward inboard position;

Figures 15A and 15B are diagrammatic views illustrating on a larger scale the corresponding position of the driving disks and crank pins.

Figure 5:
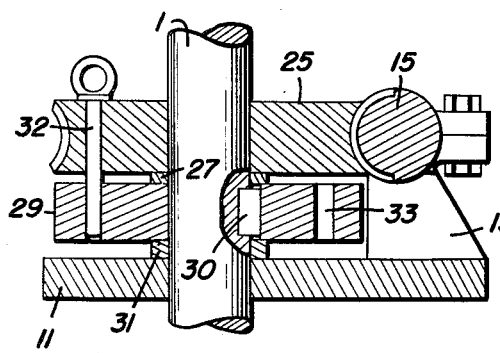
Figure 5 is a view in vertical section taken on the irregular line 5—5 of Figure 3.
Figure 6:
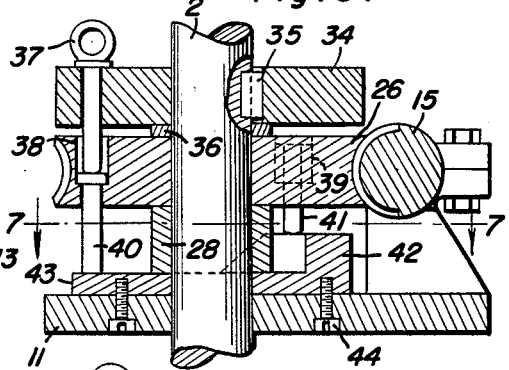
Figure 6 is a view in vertical section taken on the irregular line 6—6 of Figure 4.
Figure 3:
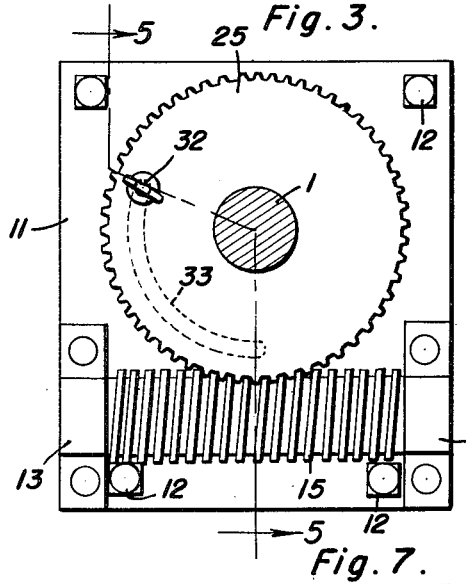
Figure 3 is a view in horizontal section taken on the line 3—3 of Figure 1 and drawn to a larger scale.

Referring now to the drawings, by numerals, according to my invention, a pair of the usual upright crane, or crank type davits 1, 2 are mounted in a deck structure 3 with lower ends journaled in suitable bearings 4 on supports 5, shown in dotted lines in Figure 1, and whereby said davits are rotatable to swing the upper ends thereof inboard and outboard for swinging the boat 6 into inboard and outboard positions respectively. The usual block and tackle 7 on the davits 1, 2 with cables 8 suspend said boat 6 from the upper ends of said davits. A cable 9 is secured at its ends by swivel connections 10 to said upper ends of the davits 1, 2 for a purpose presently seen.

A pair of bearing plates 11 are bolted, as at 12, on the deck structure 3 with the davits 1, 2 extending through the center thereof and journaled therein, and which are each formed with a pair of upright corner bearing brackets 13 in which is journaled a horizontal worm shaft 14 with a pair of oppositely pitched worm sections 15 thereon interposed between the bearing brackets of the pairs.

A drive, preferably crank operated, is provided for the worm shaft 14 at one end thereof comprising a horizontal crank shaft with end hand cranks 17 thereon and which is journaled in the upper end of a suitable gear housing 18 upstanding from the deck structure 3 and bolted thereto, as at 19. A vertical shaft 20 is suitably journaled in the gear housing 18 and to the upper end of which the crank shaft 16 is operatively connected by a pair of bevel gears 23, 24. A pair of bevel reduction gears 23', 24' operatively connect the lower end of said shaft 20 with the worm shaft 14.

A pair of worm gears 25, 26 loose on the davits 1, 2, respectively, for rotation about the same each mesh with one of the worm sections 15. A collar 27 on the davit 1 supports the worm gear 25. A collar 28 on the davit 2 supports the worm gear 26.

A driving disk 29 is keyed to the davit 1 coaxially therewith, as at 30, and supported below the worm gear 25 by a collar 31 on said davit. A crank pin 32 is suitably fixed in the worm gear 25 to depend into an arcuate slot 33 in the driving disk 29 concentric to the axis of said disk and subtending an arc of substantially 135°.

A driving disk 34 is keyed on the davit 2 coaxially therewith, as at 35 above the worm gear 26 and is supported by a collar 36 on said davit. A crank pin 37 is vertically slidable in the driving disk 34 to descend by gravity, in a manner presently described, into one or the other of a pair of sockets 38, 39 extending downwardly into the worm gear 26 and spaced around the same in substantially 120° angular relation at the same radius from the axis of said gear as the crank pin 37. The crank pin 37, as will presently more clearly appear, depends into the sockets 38, 39 to couple the worm gear 26 and driving disk 34.

A pair of vertically slidable headed push pins 40, 41 for pushing the crank pin 37 upwardly out of the sockets 38, 39 depend out of the sockets 38, 39 below the worm gear 26 for revolving by said gear onto and off of an arcuate cam 42 concentric to the axis of rotation of the worm gear 26 and rising on the inboard side of the davit 2 from an attaching plate 43 bolted, as at 44, to the bearing plate 11 through which davit 2 extends. The push pins 40, 41 are suspended by the heads thereof in the bottoms of the sockets 38, 39.

Referring now to the operation of the mechanism in swinging the boat 6 to outboard position from final inboard position shown in Figures 1 and 2, and first as regards the position of the parts in the final inboard position of said boat. The crank pin 32 in worm gear 25 on davit 1 is at one end of the slot 33 of the driving disk 29 on said davit 1, as best shown in Figure 2A. Push pin 40 in socket 38 of worm gear 26 on davit 2 is off the cam 42 and has descended, and the crank pin 37 in driving disk 34 on davit 2 has descended and entered socket 38 to couple the worm gear 38 and driving disk 34. The push pin 41 in socket 39 rests on the cam 42, is elevated thereby, but is in idle position relative to the crank pin 37.

With the parts positioned as described in the above, the crank shaft 16 is rotated to rotate the worm shaft 14, in the direction indicated by the arrow in Figures 1 and 2 whereupon the worm sections 15 will rotate the worm gears 25, 26 in opposite directions, relatively, i. e., counterclockwise and clockwise respectively, as indicated by the arrows in Figures 2, 9, 10, and 11 to swing the boat into outboard position by stages as follows.

Referring now to Figures 9, 9A and 9B, in the first stage of operation toward outboard position, the driving disk 34 on davit 2, and consequently said davit, will be driven by the worm gear 26 clockwise substantially 90° during which the boat 6 through the cables 7 and the weight of the boat 6 on said cables will rotate the davit 1 and the driving disk 29 thereon clockwise through substantially 45° while the worm gear 29 on davit 1 is rotating idly counterclockwise. This revolves the slot 33 and crank pin 32 oppositely, relatively, as indicated by the arrows in Figure 9A to cause said pin 32 to travel to the opposite end of the slot 33 with a delayed action into engagement with said outer end as shown in full lines in Figure 9A so that the end of this stage the driving disk 29 on davit 1 is coupled to the worm gear 25 for drive thereby in the same direction. One end of the boat 6 is now swung in between the davits 1, 2 with the boat headed for movement between the same in outboard direction. At this point, the second stage of operation begins.

In the second stage of operation of swinging the boat 6 into outboard position, and referring now to Figures 10, 10A and 10B, the worm gear 25 on davit 1, through the crank pin 32 and slot 33, picks up and rotates driving disk 29 and davit 1 counterclockwise, substantially 45°, while the worm gear 26 on davit 2 is still coupled to the driving disk 34 and said gear rotates said disk and davit 2 clockwise substantially 45°. This swings the boat 6 diagonally in between the davits 1, 2 as shown in Figure 10, a step further toward outboard position. At this point, the third stage of operation begins.

In the third stage of operation in swinging the boat toward outboard position, and referring now to Figures 11, 11A and 11B, the worm gear 25 on davit 1, through the crank pin 32 and slot 33 now rotates the driving disk 29 and davit 1 counterclockwise substantially 90°. Worm gear 26 on davit 2, through crank pin 37 and socket 38 rotates the driving disk 26 on davit 2 clockwise substantially 90°. This moves the aforementioned end of the boat 6 past final outboard position and the other end in between the davits 1, 2 in line therewith, as shown in Figure 11. At this point, push pin 40 rides up on cam 42, pushes crank pin 37 out of socket 38 and uncouples the worm gear 26 and driving disk 34 on davit 2 thus uncoupling said davit from the drive. However, crank pin 32 and slot 33 still couple worm gear 25 on davit 1 and driving disk 29 for drive of said davit 1 counterclockwise by such rotation of said gear 25. A fourth stage of operation now takes place.

In the fourth stage of operation in swinging the boat 6 toward outboard position, and referring now to Figures 12, 12A and 12B, the worm gear 25 on davit 1, through crank pin 32 in slot 33 rotates driving disk 29 and davit 1 counterclockwise substantially 90°, thus moving the corresponding end of the boat 6, previously in line with the davits 1, 2, into final outboard position. Cable 9 pulls uncoupled davit 2 counterclockwise substantially 45°, whereby the boat 6 is moved completely into final outboard position, as shown in Figure 12. Crank pin 32 is at the end of the slot 33 opposite the end from which it started and so as to uncouple worm gear 25 and driving disk 29 on davit 1 upon clockwise rotation of said worm gear 25. Driving disk 34 on davit 2 has been rotated counterclockwise by such rotation of davit 2 under pull of the cable 9, to revolve the crank pin 37 in the same direction, in wiping engagement with the top of the worm gear 26, and from alignment with the socket 38 into alignment with the socket 39. Push pin 41 in socket 39 is off the cam 42 so that crank pin 37 has descended into socket 39 whereby worm gear 36 and driving disk 34 are coupled for drive of davit 2. Push pin 40 of socket 38 is on cam 42 and raised, but idle.

To swing the boat 6 from outboard to inboard position, the worm shaft 14 is operated in the direction opposite that indicated by the arrows in Figures 1 and 2 to rotate the worm gears 25 oppositely, relatively, to reverse the mechanism through stages of operation now to be described.

Referring now to Figures 13, 13A, 13B, in the first stage of operation in swinging the boat 6 inboard from the final outboard position shown in Figure 12, worm gear 26 on davit 2, through the crank pin 37 and driving disk 34 rotate davit 2 counterclockwise substantially 90° and davit 1 is rotated substantially 45° in the same direction through the cables 7 and the weight of the boat 6 thereon, while worm gear 25 on davit 1 is driven clockwise until crank pin 32 engages the end of slot 33 in driving disk 29 remote from the end from which said pin started, and as shown in Figure 13A and thus limits rotation of the davit 1 counterclockwise, the cables 7 swinging to permit the differential rotation of said davits 1, 2. Thus, worm gear 25 and driving disk 29 are coupled for rotation of davit 1 clockwise by further rotation in that direction of worm gear 25. At the end of this stage of operation, one end of the boat 6 is headed between davits 1, 2 to pass between the same and as shown in Figure 13. A second stage of operation now takes place in swinging the boat inboard.

Figure 8:
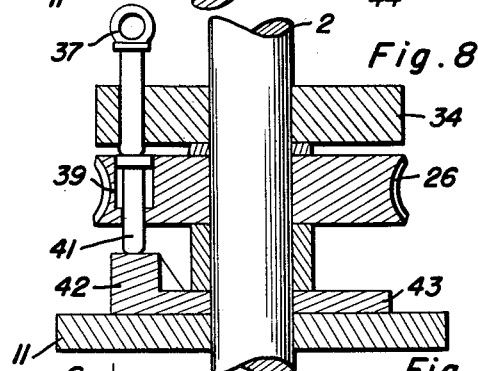
Figure 8 is a view in vertical section taken on the irregular line 8—8 of Figure 13 and drawn to a larger scale.
Figure 7:
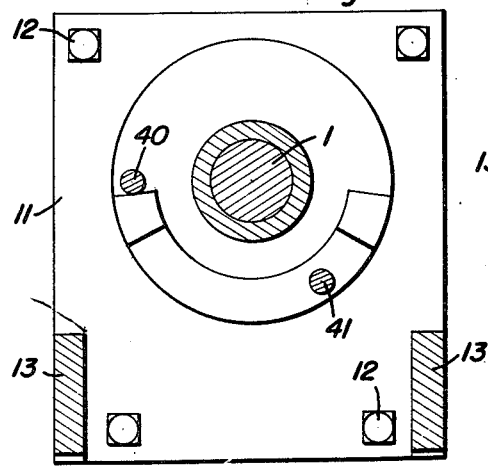
Figure 7 is a view in horizontal section taken on the line 7—7 of Figure 6.
Figure 4:
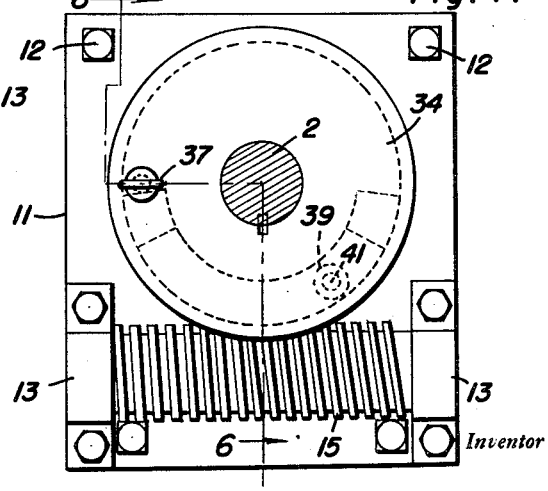
Figure 4 is a view in horizontal section taken on the line 4—4 of Figure 1 and drawn to a larger scale.

In the second stage of operation in swinging the boat 6 to inboard position, and referring now to Figures 14, 14A, 14B, worm gear 26 rotates driving disk 34, and hence davit 2, counterclockwise substantially 135° and worm gear 25 rotates driving disk 29 on davit 1 clockwise in substantially like degree, whereby the headed end of the boat 6 is moved inboard past davit 2 and the other end is moved in between said davits 1, 2. At this point, push pin 41 in socket 39 rides up cam 42, as indicated in Figure 14B, and pushes crank pin 37 out of socket 39, as shown in Figure 8, so that worm gear 26 and driving disk 34 are uncoupled. A third stage of operation now takes place.

In the third stage of operation in swinging the boat 6 inboard, and referring now to Figures 15, 15A, 15B, worm gear 25 continues to rotate clockwise while coupled to driving disk 29 to rotate davit 1 similarly 45°, at which point the other end of the boat is swung inboard past davit 1 with davit 2 idling slightly clockwise.

The mechanism now operates through a fourth stage in swinging the boat into final inboard position. In this fourth stage, worm gear 25 continues to rotate driving disk 29 and davit 1 clockwise, substantially 45°, to move the boat into final inboard position and through the cable 9 rotate davit 2 counterclockwise, substantially 45°, to move the boat into final inboard position. During such rotation of davit 2, driving disk 34 thereon is similarly rotated, while worm gear 26 is rotated counterclockwise to position the crank pin 37 in alignment with socket 38 to drop into said pocket in the complete inboard position of the boat 6. The worm gear 26 and driving disk 34 on davit 2 are now again coupled for swinging of the boat 6 toward outboard position, in the manner already described.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In combination, a pair of journalled boat davits having boat suspending cables thereon and being rotatable from inboard to outboard position to swing a boat into outboard position, and operating mechanism for said davits comprising a pair of gears freely rotatable, respectively, on said davits, a drive for said gears operating the same simultaneously in opposite directions with respect to each other, a disk fast on one davit in driven relation to the gear on said davits, pin and socket coupling devices carried by said disk and related gear, respectively, whereby rotation of said related gear will rotate said davit through an initial stage of operation toward outboard position, pin engaging means uncoupling said devices after said stage of operation of said davit for independent further rotation of said davit toward outboard position, and lost motion driving connections between the other davit and the gear thereon rotating said other davit into outboard position after the first stage of operation of said first named davit, rotation of the last named davit acting through the cables under the weight of the boat thereon to further rotate said first named davit after its initial stage of operation.

2. The combination according to claim 1 wherein said first named devices comprises a socket in said disk, and a gravity pin in said socket and gear slidable out of the socket to uncouple said devices, said means comprising a cam operated push pin in said disk for pushing said gravity pin out of said socket.

3. The combination according to claim 1 wherein said lost motion driving connections comprise an arcuately slotted disk fast on said last named davit to be rotated thereby, and a pin in the gear on said last named davit travelling in said slot.

4. In combination, a pair of journalled boat davits having boat suspending cables thereon and being rotatable from inboard to outboard position, and operating mechanism for said davits comprising a rotary drive shaft having a worm thereon, a worm gear on one davit meshing with said worm and freely rotatable on said davit, said worm gear having a socket therein, a disk fixed on said davit in driven relation to said worm gear, a slidable gravity pin in said disc normally entering said socket to couple said worm gear and disk together whereby initial rotation of said gear will rotate said davit through a stage of operation toward outboard position, cam operated means sliding said pin out of said socket at the end of said stage of operation of said davit, and lost motion driving connections between said shaft and the other davit for rotating said other davit toward outboard position.

5. The combination according to claim 4 wherein said means comprises a push pin in said gear, and a stationary cam beneath said gear for operating said push pin.

ASA J. HARRIS.

References Cited in the file of this patent

UNITED STATES PATENTS

| Number | Name | Date |
|---|---|---|
| 1,173,821 | Leuduer | Feb. 29, 1916 |
| 1,258,316 | Caswell | Mar. 5, 1918 |
| 1,430,516 | Vanderwal | Sept. 26, 1922 |
| 1,494,639 | Simpson et al. | May 20, 1924 |